Feb. 18, 1930.   A. R. MUMFORD   1,747,314
SEPARATOR
Filed Feb. 9, 1927
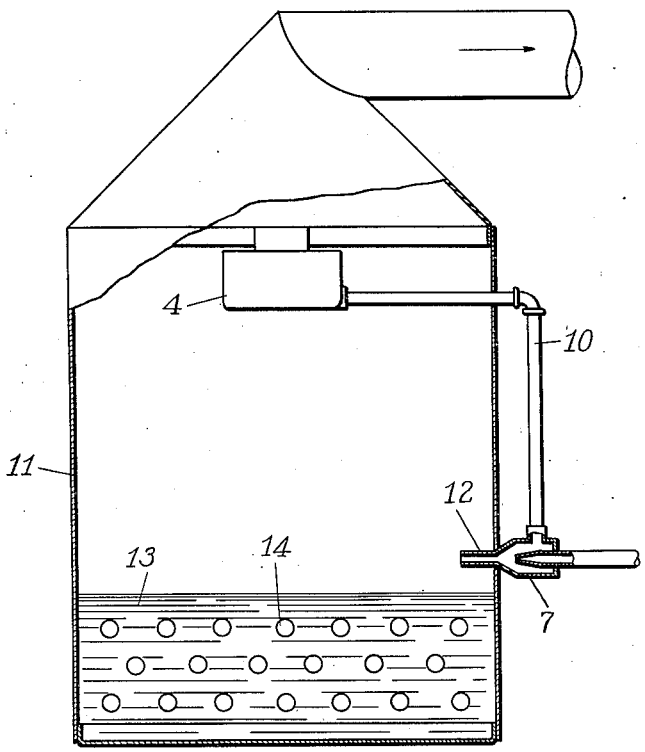
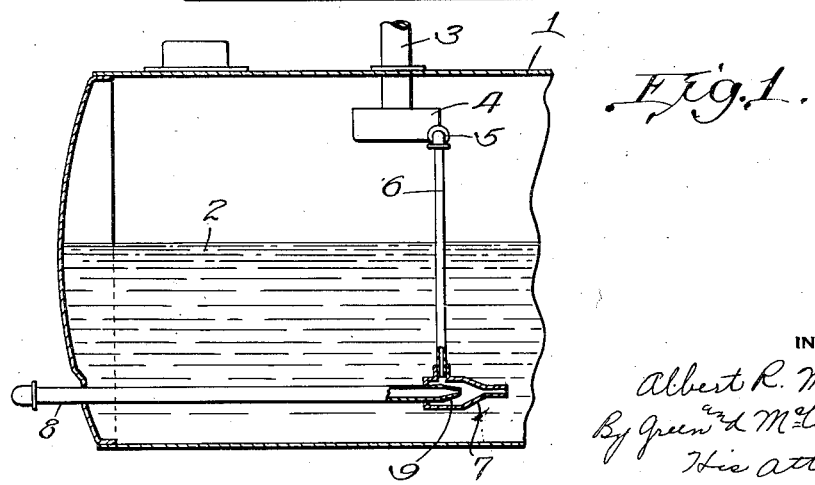
INVENTOR
Albert R. Mumford
By Green and McAllister
His attorneys Patented Feb. 18, 1930

1,747,314

UNITED STATES PATENT OFFICE

ALBERT R. MUMFORD, OF BOGOTA, NEW JERSEY, ASSIGNOR TO JOHN M. HOPWOOD, OF DORMONT, PENNSYLVANIA

SEPARATOR

Application filed February 9, 1927. Serial No. 167,057.

Separators of various arrangements are well known in many different industries and it will, therefore, be apparent that although the present invention is described in connection with a steam separator used in connection with a steam generator it is equally applicable to other types of purifiers such, for example, as those used in connection with the waste liquors of paper mills and in many other places.

This invention relates to separators and more particularly to an improved arrangement for removing the accumulated fluid from a separating mechanism.

Steam separators are generally positioned in the steam generating chamber or pressure vessel above the level of the water therein and are so placed that the steam formed in the vessel must pass through the separator to the offtake. Originally, gravity was depended upon to return the water accumulated in the separator to the water in the vessel. It will be apparent that such an arrangement is capable of handling but a relatively small quantity of water because of the small difference in head between the separator and the water in the vessel, with the result that during times of heavy steam consumption, when an unusual amount of water is entrained by the steam, the separator is of little use because of the failure of the system to remove water fast enough therefrom.

Certain objections to the above arrangement are overcome by a system wherein the water is removed from the separator through a pipe extending through the wall of the steam chamber or pressure vessel to an outside reservoir, a special trap or some similar device. This type of arrangement is also objectionable because of the piping or joints that must be constantly maintained against a relatively large pressure difference and, in addition, the water so removed either constitutes a direct loss of energy from the system or must be returned thereto by repumping and renewing its static head.

An object of this invention is to provide an improved apparatus for removing the accumulated fluid from a separating or purifying apparatus.

A further object is to provide a device of the type set forth of such construction and arrangement that the removal of water, for example, from a steam separator may be accomplished independently of gravity and without the necessity of carrying such water outside of the associated pressure vessel.

A still further object is to provide an arrangement of the type described which will be simple in construction, cheap to manufacture and assemble and positive and reliable in operation.

These and other objects which will be apparent to those skilled in this particular art are accomplished by means of the invention illustrated in the accompanying drawing, in which Fig. 1 is a sectional view through an apparatus constructed in accordance with one form of this invention, certain of the related mechanism being illustrated in elevation and Fig. 2 is a similar view of the invention applied to a different type of apparatus.

The particular embodiment of this invention which has been chosen for the purposes of illustration is shown in Fig. 1 in connection with a vaporizer such as pressure vessel 1 containing a quantity of water 2 for steam generating purposes. A steam offtake pipe 3 is associated with the vessel and a steam separator 4 is so positioned within the pressure vessel that steam passing to the offtake must first be passed through the separator where the entrained water is removed. The separator itself may be of any desired construction such, for example, as that described in the application of John M. Hopwood, Serial No. 45,839, filed July 24, 1925.

In such an arrangement, the freshly generated steam passes into the separator through openings in the top thereof (not shown) and the entrained water is separated therefrom. A water offtake 5 is provided at the bottom of the separator and a pipe 6 is connected with the offtake for the purpose of returning the separated water back from the separator to the pressure vessel.

It will be apparent that rapid and complete removal of the separated water from the separating mechanism is essential to the efficient operation thereof. It will also be apparent, as above set forth, that gravity alone is insufficient to remove such water rapidly enough, particularly during periods of large demand, and this results from the relatively small head of water in the offtake 6 as above described.

In order to ensure constant and rapid removal of the separated water from the separating mechanism and its immediate return to the pressure vessel I provide a mechanism which operates to so reduce the pressure at the lower end of the water return or offtake 6 that it will be impossible for such fluid even to back up therein or to in any way prevent the proper functioning of the apparatus. As illustrated, this is accomplished by means of a standard injector, inductor or the like 7 which is so associated with the lower end of the water return pipe 6 that the latter enters the injector at a point where the static pressure is the lowest. The feed line 8 for supplying fresh water to the pressure vessel is extended to a nozzle 9, positioned within the injector 7 in operative relation thereto so that the small excess pressure in the feed water lines, which pressure has its source in the same apparatus, ordinarily feeding the water to the pressure vessel, is used to operate the injector and withdraw the accumulated water from the separator 4.

It will be apparent that such an arrangement removes the water from the separator by providing a point of low static pressure and by directly connecting the water offtake of the separator with such low pressure point. In the generation of steam this low pressure point is shown as being within the vaporizing or steam generator chamber. Because the rate of steam generation or water consumption must be equaled by the rate of feeding fresh water to the pressure vessel, the amount of static pressure reduction operative to remove water from the separator is in proportion to the amount of steam generation over any extended period of time and therefore is in proportion to the amount of entrained water necessary to be returned through the return pipe 6. It will also be apparent that the amount of static pressure reduction can be proportioned by properly designing the apparatus to the largest known or expected quantity of entrained water which it will be necessary to remove, thus leaving at ordinary times a pressure reduction in excess of that necessary for removing ordinary quantities of water.

It will be readily understood that the temperature of the feed water is so much below the temperature of the steam that the inflowing feed water will condense any steam descending the return pipe 6 from the separator. Therefore, when there is no accumulated water in the separator there will be some flow of steam through the return pipe but such connection can never become a "steam bound" because of the steam condensing effect of the feed water.

In certain industries it is desirable to position the injector for creating the point of low pressure on the outside of the associated vaporizing chamber for the purpose of easy removal or cleaning. In such case, the separator is connected to a return pipe 10 extending outwardly of the associated chamber 11 to the injector 7 through which the separated fluid is drawn to a pipe 12 which returns it to the vaporizer. In Fig. 2 the separator is shown as a purifier for the gases obtained from the liquor 13 which is heated by associated heating coils 14.

It will be apparent that the present invention is of use in connection with any industry using a fluid purifier or separator.

What I claim as new and desire to secure by Letters Patent is:

1. The combination in a steam generating chamber of a separator having a water outlet, a feed line for supplying water to said chamber, means operated by the flow through said feed line to establish a zone of relatively low pressure within said chamber and a connection leading from said outlet to said low pressure zone.

2. The combination in a steam generating chamber of a separator having a water outlet, a feed line entering said chamber, an ejector operated by the flow through said feed line to establish a zone of relatively low pressure and a pipe for discharging water from said separator outlet into said ejector.

3. The combination in a steam generating chamber of a separator having a water outlet, a feed line for supplying water to said chamber and means operative by the flow through said feed line to remove accumulated water from the separator and return it to said chamber.

4. The combination with a steam generator of a steam separator having a water return pipe, a feed line entering said generator and means operated by the flow of water through said feed line for withdrawing water through said outlet, said means being so constructed that steam drawn through said outlet is intermingled with and condensed by said feed water.

5. The combination with a vaporizer of a separator provided with a fluid outlet, a feed line for supplying fluid to said vaporizer and means responsive to the flow through said line for withdrawing fluid from said separator.

6. The combination with a vaporizer of a separator provided with a fluid outlet, a feed line for supplying fluid to said vaporizer and means operated by the flow through said line for withdrawing fluid from said separator and returning it to said vaporizer.

7. The combination of a boiler, a steam separator mounted in said boiler and having a water outlet, an injector mounted in said boiler and having its discharge in communication with said boiler, and its suction inlet operatively connected with said water outlet, and means operatively connected with the motive fluid inlet of said injector for supplying said injector with fluid at a pressure exceeding the boiler pressure.

In testimony whereof, I have hereunto subscribed my name this 1st day of February, 1927.

ALBERT R. MUMFORD.